United States Patent [19]

Gustafson et al.

[11] Patent Number: 4,802,342

[45] Date of Patent: Feb. 7, 1989

[54] PROTECTIVE GRILLE AND AIR FLOW STRAIGHTENER FOR TRANSPORT REFRIGERATION APPARATUS

[75] Inventors: Alan D. Gustafson, Eden Prairie; Richard F. Unger, New Prague, both of Minn.

[73] Assignee: Thermo King Corporation, Minneapolis, Minn.

[21] Appl. No.: 182,655

[22] Filed: Apr. 18, 1988

[51] Int. Cl.⁴ ............................................. B60H 1/32
[52] U.S. Cl. ........................................ 62/239; 62/262
[58] Field of Search ................. 98/40.2; 62/404, 428, 62/262, 239

[56] References Cited

U.S. PATENT DOCUMENTS

| | | | |
|---|---|---|---|
| 3,406,530 | 10/1968 | Riello | 62/262 |
| 3,477,211 | 11/1969 | Pietsch | 62/262 X |
| 4,402,191 | 9/1983 | King | 62/239 |
| 4,409,797 | 10/1983 | King et al. | 62/239 |
| 4,424,684 | 1/1984 | Waldschmidt et al. | 62/239 |
| 4,441,333 | 4/1984 | Mayer | 62/239 |

Primary Examiner—Lloyd L. King
Attorney, Agent, or Firm—D. R. Lackey

[57] ABSTRACT

Transport refrigeration apparatus including a condenser section containing an inverted U-shaped refrigerant condenser coil which defines a central opening which functions as a fan chamber having a vertically oriented air discharge side. A propeller fan is disposed in the central opening of the condenser coil which draws air through the condenser coil and discharges it through the vertically oriented discharge side of the opening. A metallic grille is disposed across the air discharge side of the central opening, with the grille having a plurality of horizontally spaced, vertically oriented louvers which straighten the discharge air flow in vertical planes and reduce short circuiting of the discharge air back into the condenser coil. The louvers are spaced by a dimension selected to enable the metallic grille to perform the function of a protective or safety grille across the fan chamber.

3 Claims, 2 Drawing Sheets

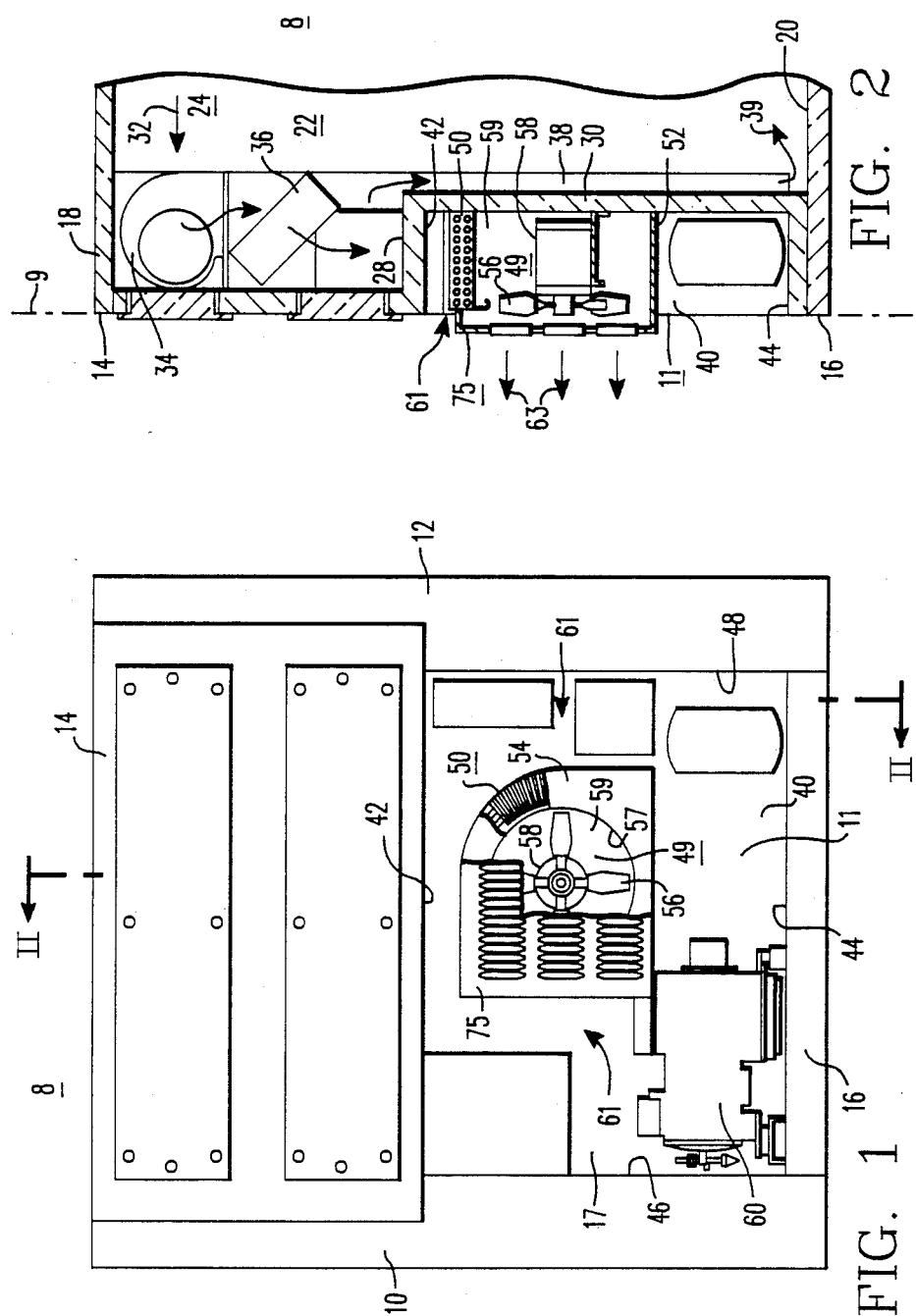

PROTECTIVE GRILLE AND AIR FLOW STRAIGHTENER FOR TRANSPORT REFRIGERATION APPARATUS

BACKGROUND OF THE INVENTION

1. Field of the Invention

The invention relates in general to transport refrigeration apparatus, and more specifically to the condenser section of such apparatus.

2. Description of the Prior Art

U.S. Pat. Nos. 4,402,191; 4,409,797; and 4,424,684, which are assigned to the same assignee as the present application, cover various aspects of trasnport refrigeration apparatus in the form of a refrigerated container. As pointed out most clearly in U.S. Pat. No. 4,424,684, an inverted U-shaped condenser coil of the condenser section of the apparatus required an air flow straightening device in the form of a sheet metal frame structure which supports a honeycomb panel 72. The honeycomb panel 72 consists of cells with an aspect ratio greater than 1, i.e., the cell length exceeds the cell diameter, to reduce short cycling of the condenser discharge air back into the condenser coil. Short cycling can quickly cause a high discharge pressure cutout. U.S. Pat. No. 4,441,333, assigned to the same assignee as the present invention, also discusses the use of honeycomb air flow straighteners in the evaporator section of transport refrigeration apparatus.

In the condenser section, in addition to the honeycomb air flow straightener 72 disclosed in U.S. Pat. No. 4,424,684, a protective or safety grille 70 overlies the general area of the condenser coil and fan to prevent intrusion into the fan space.

SUMMARY OF THE INVENTION

While the honeycomb air flow straightener performs well, it is costly, and it requires a special metallic support structure. Also, care must be taken by maintenance personnel as the honeycomb cracks rather easily, producing very sharp cutting edges.

Notwithstanding the long accepted use of honeycomb air flow straighteners in the transport refrigeration industry, we have discovered a very low cost, effective alternative that not only eliminates the honeycomb and its metallic support structure, but also eliminates the need for a separate safety grille. We have found that straightening the condenser discharge air in a vertical plane reduces short cycling to such an extent that honeycomb is unnecessary. Straightening the discharge air in a vertical plane prevents short cycling back into the leg portions of the inverted U-shaped condenser coil, which is where the majority of the intake air enters the condenser coil.

The invention is implemented by a metallic grille constructed of vertically oriented louvers turned 90 degrees to the face of the grille. The louvers are low cost, as they are manufactured by slitting a sheet of metal, such as aluminum, to create the louvers, and turning the louvers only at their ends. The louvers, having their major flat surfaces parallel to the direction of air flow, present very little restriction to air flow, while providing the necessary open area. The dimension between louvers is selected to also provide the safety grille function, such as by selecting a louver-to-louver dimension of about 0.38 inch.

BRIEF DESCRIPTION OF THE DRAWINGS

The invention may be better understood and further advantages and uses more readily apparent when considered in view of the following detailed description of exemplary embodiments, taken with the accompanying drawings, in which:

FIG. 1 is an elevational view of transport refrigeration apparatus constructed according to the teachings of the invention;

FIG. 2 is a cross sectional view of transport refrigeration apparatus shown in FIG. 1, taken generally between and in the direction of arrows II—II in FIG. 1;

DESCRIPTION OF PREFERRED EMBODIMENTS

Figure 3:
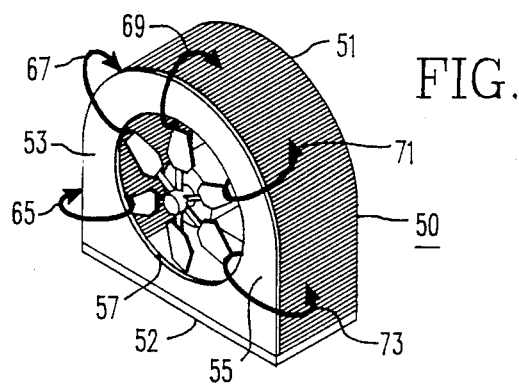
FIG. 3 is a perspective view of the condenser coil and fan arrangement shown in FIGS. 1 and 2, illustrating the short cycling problem.

FIGS. 1 and 2 are similar to FIGS. 1 and 2 of U.S. Pat. No. 4,424,684, except for modifications thereof according to the teachings of the present invention, and U.S. Pat. No. 4,424,684 is hereby incorporated into the specification of the present application by reference.

FIGS. 1 and 2 are elevational views of transport refrigeration apparatus in the form of a container refrigeration unit 8. Container unit 8 has a front plane 9 behind which a refrigeration system 11 is disposed. Front plane 9 is defined by lateral flanges 10 and 12, and top and bottom flanges 14 and 16, which provide an opening 17 surrounded by top and bottom walls 18 and 20, respectively, and side walls 46 and 48. Refrigeration system 11 includes two main sections, an upper evaporator section 24 and a lower condenser section 26. Sections 24 and 26 are thermally insulated from one another by a horizontal thermal wall 28 between the top of condenser section 26 and the bottom of evaporator section 24, and by a vertical thermal wall 30 at the rear of condenser section 26.

In the exemplary air flow arrangement set forth in FIG. 2, air, indicated by arrow 32, is drawn from a served space 22 of container unit 8 by an evaporator blower 34, and blower 34 discharges the return air downwardly through a refrigerant evaporator 36. Conditioned air from evaporator 36 then flows through passage 38 behind condenser section 26, as well as along both sides of condenser section 26, back into served space 22, as indicated by arrow 39.

Condenser section 26 includes a forwardly open pocket 40. Pocket 40 is defined by a top wall 42, bottom wall 44, and side walls 46 and 48. The remaining components of refrigeration system 11, including a power pack 60 comprising a refrigerant compressor and prime mover, are disposed in the lower portion of pocket 40.

Pocket 40 includes a condenser 50, shown in perspective in FIG. 3, with condenser 50 having finned coils which are in an inverted U-shape configuration, as described in detail in the incorporated patent. Condenser 50 includes a bight 51 and depending leg portions 53 and 55. Condenser 50 is located in the the upper central portion of pocket 40, with a plate member 52 being disposed across the lower ends of leg portion 53 and 55 to block air flow into condenser 50 from the bottom. A condenser face plate 54 covers the front side of condenser 50, with face plate 54 defining a fan ring opening 57. Thus, condenser 50, back wall 30, plate member 52 and face plate 54 cooperatively define a fan chamber 59 in which is disposed an axial flow fan 49 comprising a propeller 56 and an electric motor 58.

Condenser inlet air, indicted by arrows 61, is drawn into the portion of pocket 40 which surrounds condenser 50, and through the finned coils of condenser 50. Fan 49 forces condenser discharge air, indicated by arrows 63, perpendicularly away from the vertically oriented air discharge side of fan chamber 59, which is essentially coincident with the front plane 9 of container unit 8.

In refrigeration system arrangements where the condenser discharge air 63 is relatively close to the condenser inlet air 61, the discharge air can short cycle, indicted by arrows 65, 67, 69, 71 and 73 in FIG. 3. Short cycling undesirably displaces fresh ambient air with heated condenser discharge air. This reduces the cooling efficiency of condenser 50, and can increase discharge pressure to a point which causes a high discharge pressure cut out by a discharge pressure sensor (not shown).

The present invention reduces short cycling and discharge pressure by a louvered grille 75 which is mounted substantially in the front plane 9 of container unit 8, across opening 57 to the fan chamber 59. Louvered grille 75 is constructed to flatten the flow of condenser discharge air 63 in a vertical plane, eliminating the need for the honeycomb air flow straightener 72 shown in FIGS. 1 and 2 of the incorporated patent. Louvered grille 75 is also constructed to prevent unauthorized intrusion into fan chamber 59, eliminating the need for the safety grille 70 across opening 57 to the fan chamber 59, as shown in FIGS. 1 and 2 of the incorporated patent.

Flattening the flow of condenser discharge air 63 in a vertical plane substantially reduces short cycling into legs 53 and 55 of condenser 50, indicted by arrows 65, 67, 71 and 73 in FIG. 3. While flattening air flow in a vertical plane would not reduce short cycling into coil bight 51, indicated by arrow 69, the major portion of inlet air 61 enters fan chamber 59 via legs 53 and 55, and thus any short cycling in the direction of arrow 69 does not significantly affect condenser efficiency or discharge pressure.

Figure 5:
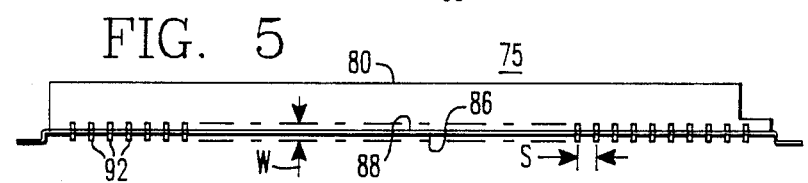
FIG. 5 is a plan view of the grille shown in FIG. 4.
Figure 4:
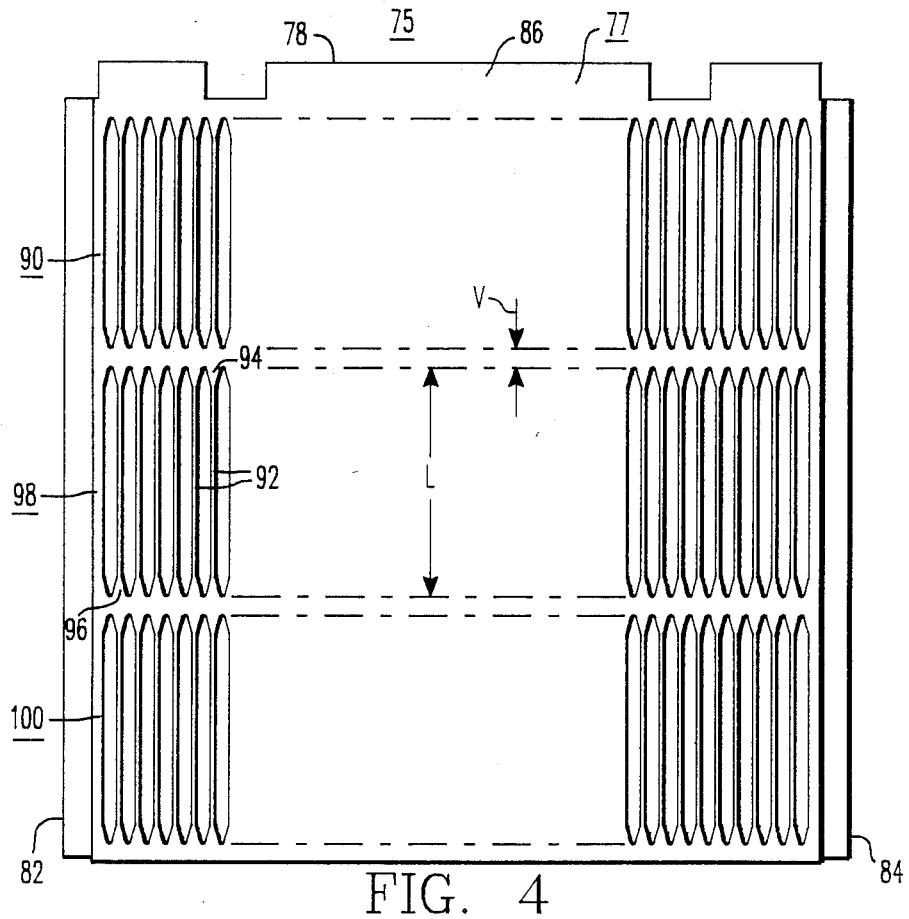
FIG. 4 is an elevational view of a condenser grille constructed according to the teachings of the invention, which provides the function of straightening condenser discharge air in a vertical plane, while also providing the function of a safety grille.

Louvered grille 75 may be manufactured for a relatively low cost, compared with the cost of the prior art honeycomb, honeycomb support structure, and safety grille, with FIGS. 4 and 5 illustrating elevational and plan views, respectively, of a preferred embodiment of louvered grille 75.

Louvered grille 75 is constructed from a flat sheet 77 of metal, such as 0.050 inch thick aluminum. Sheet 77 has upper and lower edges 78 and 80, respectively, lateral edges 82 and 84, and first and second major opposed surfaces 86 and 88.

Sheet 77 is slit in a pattern which provides a row 90 of horizontally spaced, vertically oriented louvers 92 each having upper and lower longitudinal ends 94 and 96, respectively. Additional vertically spaced rows may be provided, such as rows 98 and 100. The vertical spacing V between rows should be as small as practical, such as not exceeding about 0.5 inch.

Each louver 92 has a length dimension L between its ends 94 and 96 which is long compared with its width dimension W, with an exemplary dimension L being 6 to 7 inches, and with an exemplary dimension W being about 0.38 inch. The slitting pattern is selected such that the only attachment of each louver 92 to the flat major sheet 77 is at its upper and lower ends 94 and 96. After slitting to form cuts along both longitudinal edges or sides of each louver 92, each louver 92 is turned 90 degrees such that the flat surfaces of each louver which were just part of the major flat surfaces 86 and 88 of sheet major 77 are now perpendicular to the flat major surfaces of sheet 77. In other words, each louver 92 is twisted only at its ends 94 and 96 while maintaining the portion of each louver between its ends in a flattened condition, resulting in each louver 92 extending outwardly from both major sides 86 and 88 of sheet 77. This louver arrangement provides minimal restriction to air flow, as the only obstruction to air flow in each row of louvers 92 is the thickness dimension of each louver, e.g., 0.050 inch in the exemplary embodiment. This contrasts to a slitting pattern, for example, which would slit only along one side of each louver, with each louver then being bent, either inwardly or outwardly, along its uncut side. This alternative slitting pattern would be undesirable as it requires a much wider support base for each louver, and the wide support base would extend the complete length of each louver, substantially increasing the air resistance of the associated grille for any given louver area.

In addition to performing an effective air flow straightener function in vertical planes, grille 75 is also constructed as a safety grille by selecting the spacing S between louvers 92 to perform this function. For example, the exemplary 0.38 inch louver width W is also suitable for spacing S.

We claim as our invention:

1. Transport refrigeration apparatus including a condenser section containing a U-shaped refrigerant condenser coil having a horizontally oriented bight and vertically oriented leg portions which define a central fan chamber having a vertically oriented air discharge side, and a fan in the fan chamber which draws condenser air into the fan chamber through the bight and leg portions of the condenser coil, the improvement comprising:

air flow straightening means disposed across the air discharge side of the fan chamber to reduce short cycling of discharge air back into the leg portions of the condenser coil, said air flow straightening means including a metallic grille having a major flat sheet metal portion which includes a plurality of horizontally spaced, vertically oriented louvers for straightening discharge air flow in a vertical plane, said louvers each having upper and lower ends, and flat major portions intermediate said upper and lower ends, with said upper and lower ends being integrally joined to the major flat sheet metal portion of the grille via 90 degree twists of the joining metal which direct the flat major portions of the louvers perpendicular to the flat major sheet metal portion of the grille, said vertically oriented louvers being horizontally spaced by a dimension selected to additionally provide the function of a protective grille.

2. The transport refrigeration apparatus of claim 1 wherein the dimension between adjacent louvers does not exceed about 0.38 inch.

3. The transport refrigeration apparatus of claim 1 wherein the plurality of horizontally spaced, vertically oriented louvers define a first horizontal row of louvers, and including at least one additional horizontal row of louvers vertically spaced from said first horizontal row of louvers.

* * * * *